United States Patent [19]

Koshugi

[11] 4,308,377
[45] Dec. 29, 1981

[54] SHAPED MATERIAL COMPRISING DENATURED CHITIN AND PROCESS FOR PREPARING SAME

[75] Inventor: Junichi Koshugi, Tokyo, Japan

[73] Assignee: Kureha Kagaku Kogyo Kabushiki Kaisha, Tokyo, Japan

[21] Appl. No.: 105,250

[22] Filed: Dec. 19, 1979

[30] Foreign Application Priority Data

Dec. 29, 1978 [JP] Japan .................................. 53-161389
Dec. 29, 1978 [JP] Japan .................................. 53-161390
Jun. 15, 1979 [JP] Japan .................................. 54-75403

[51] Int. Cl.³ .............................................. C08B 37/08
[52] U.S. Cl. ...................................... 536/20; 424/180
[58] Field of Search ............................................ 536/20

[56] References Cited

U.S. PATENT DOCUMENTS

| | | | |
|---|---|---|---|
| 2,040,879 | 5/1936 | Rigby | 536/20 |
| 2,040,880 | 5/1936 | Rigby | 536/20 |
| 3,251,824 | 5/1966 | Battista | 536/20 |
| 3,879,376 | 4/1975 | Vanlerberghe | 536/20 |
| 4,027,068 | 5/1977 | Saad | 536/20 |
| 4,063,016 | 12/1977 | Austin | 536/20 |

FOREIGN PATENT DOCUMENTS 894993 9/1953 Fed. Rep. of Germany ........ 536/20

OTHER PUBLICATIONS

*Agricultural and Biological Chemistry*, vol. 42, pp. 1939–1940, Oct. 1978.
*Japanese Patents Gazette, Section Ch.*, Derwent Publications, London, GB, Week X49 Issued 19th Jan. 1977, Chapter F, p. 2.

*Primary Examiner*—Johnnie R. Brown
*Attorney, Agent, or Firm*—Wegner & Bretschneider

[57] ABSTRACT

A shaped material at the least of which surface layer comprises a denatured chitin obtained by acylation of de-N-acetylated etherified chitin represented by the following general formula:

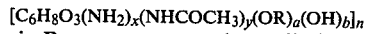

$$[C_6H_8O_3(NH_2)_x(NHCOCH_3)_y(OR)_a(OH)_b]_n$$

wherein R represents a carboxyalkyl group with two to four carbon atoms, a hydroxyethyl group, a hydroxypropyl group, a dihydroxypropyl group or an alkyl group with one to three carbon atoms, x is a number of 0.1 to 1.0, y=1.0−x, a is a number of 0.1 to 1.0, and b=1.0−a, or a salt thereof.

40 Claims, No Drawings

SHAPED MATERIAL COMPRISING DENATURED CHITIN AND PROCESS FOR PREPARING SAME

This invention relates to a shaped material comprising a denatured chitin obtained by acylation of a de-N-acetylated and etherified chitin. This invention also relates to a process for producing the shaped material.

Fiberforming polysaccharides occurring in nature are divided broadly into collagen in higher animals, chitin in arthropods and lower plants and cellulose in higher plants, and the frames of the living things are made by the sedimentation of apatite, calcium carbonate and lignin onto the above-mentioned polysaccharide respectively. Among them, the chitin is a mucopolysaccharide of poly-N-acetyl-D-glucosamine, and its amount in nature compares favorably with the amount of cellulose in nature. However, since the chitin is a highly crystalline substance and the intermolecular bonding thereof through the aminoacetyl group is extremely stable, it is very much difficult to find an appropriate solvent to dissolve, disperse or swell the chitin favorably. Accordingly, the development pertaining to the utilization of chitin resources is far behind that of cellulose and other polysaccharides.

According to the recent research concerning the chitin ot the chitin derivatives, as described in "TAN-PAKUSHITSU, KAKUSAN and KOSO (Proteins, Nucleic acids and Enzymes)", Vol. 22, No. 13, 1431-1436 (1977), Japanese Patent Publication No. 19213/73, Japanese Patent Laying Open No. 119087/76 and Japanese Patent Publication No. 24067/77, films or fibers consisting of a regenerated chitin obtained by the acetylation of a chitosan are offered by utilizing the property of the chitosan which dissolved in an aqueous dilute acid solution.

The above-mentioned Japanese Patent Publication No. 19213/73 discloses a method for obtaining the film of the regenerated chitin by making a film of chitosan followed by acetylating the thus formed film in the solid phase. The method comprises a series of the following steps: at first, the chitosan is dissolved into an aqueous dilute acid solution and a film of a chitosan-salt obtained by drying the solution is immersed into an aqueous dilute alkali solution or a water-containing solvent of organic base to prepare the film of chitosan. After swelling the thus obtained film of chitosan in water, the swollen film of chitosan is soaked into a solvent such as ethanol, acetone, pyridine, etc. and is N-acetylated with an acetic acid in the presence of a dehydrating condensation agent of dicyclohexylcarbodiimide to obtain the film of the regenerated chitin. However, according to this method, it takes an extremely long period of time to complete the acetylation. Moreover, the published reference has an object of obtaining film-shaped articles consisting of the regenerated chitin and only suggests its application to an acoustic vibrator plate. Accordingly, it is still unsatisfactory from the view point of utilization of chitin resources.

As for the other methods of N-acetylation of the chitosan, a method in which the chitosan is made to react with an acetic anhydride in a solution of pyridine or a method in which the chitosan is made to react with the acetic anhydride in a perchloric acid solution has been reported. However, also in these methods, it takes a long period of time to complete the acetylation. Especially, in the case where the chitosan contains water, the velocity of acetylation is extremely small.

The present inventor, during a series of his research into the chitin and the chitin derivatives, has quite surprisingly found that when a de-N-acetylated substance of a carboxyalkylchitin, an etherified chitin with glycol, an etherified chitin with glycerol or an alkylchitin—hereinafter these are referred to as a de-N-acetylated and etherified chitin—is made to react with an anhydride of an organic acid, an acylation of the above-mentioned de-N-acetylated and etherified chitin occurs instantly and to form an acylated product—hereinafter this is referred to as a denatured chitin—which is insoluble in water, acids, alkaline solutions and organic solvents. In addition, it has been also found that the above-mentioned reaction is possibly applied for making a novel shaped material at the least of which surface layer comprises the above-mentioned insoluble denatured chitin. Furthermore, it has been also found that the thus obtained shaped material has an excellent function as a separating material, a base material for immobilzed enzymes, a material for dialysis and a material for absorbent.

Accordingly, an object of the invention is to prepare a shaped material comprising the denatured chitin obtained by acylating the de-N-acetylated and etherified chitin. Another object of the invention is to prepare a shaped material at the least of which surface comprises the above-mentioned denatured chitin. Further object of the invention is to provide a process for producing the shaped material. Other objects of the invention will be apparent from the following descriptions.

According to the present invention, there is provided with a shaped material at the least of which surface layer comprises a denatured chitin obtained by acylation of a de-N-acetylated and etherified chitin represented by the following general formula (I):

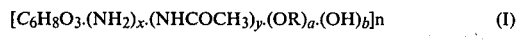

$$[C_6H_8O_3 \cdot (NH_2)_x \cdot (NHCOCH_3)_y \cdot (OR)_a \cdot (OH)_b]n \quad (I)$$

wherein R represents a carboxyalkyl group with two to four carbon atoms, a hydroxyethyl group, a hydroxypropyl group, a dihydroxypropyl group or an alkyl group with one to three carbon atoms, x is a number of 0.1 to 1.0, y=1.0−x, a is a number of 0.1 to 1.0 and b=1.0−a, or a salt thereof.

The above-mentioned "a shaped material at the least of which surface layer comprises a denatured chitin" means a shaped material of which the surface layer comprises the denatured chitin insoluble in water, acids, alkaline solutions and organic solvents and of which the interior comprises the above-mentioned de-N-acetylated and etherified chitin or the salt thereof, or a shaped material wholly or substantially wholly comprising the denatured chitin.

The shaped material of the present invention is produced by bringing an aqueous solution of the de-N-acetylated and etherified chitin into contact with an anhydride of an organic acid or with a mixture of the anhydride and the organic acid. The time period necessary for the acylation of the de-N-acetylated substance caused by the above-mentioned contact is advantageously shorter in spite of the presence of water than that for the above-mentioned acetylation of the chitosan, although the theoretical basis therefor has not been clearified. In the present invention, this rapid acylation facilitates the formation of the shaped material with a granular, spherical, filamentous, film-like or any other three-dimentional structure or, if necessary, a hollow structure thereof according to the modes of the contact in a very short time period.

The shaped material of the present invention is chemically and physiologically stable and safe, and is excellent in permeability, adsorbability and bio-compatibility, and accordingly it is possibly applied to broad fields, for instant, as a material for capsules, a separating material, an adsorbing material, a material for catching heavy metals, a material for slow-releasing medicines, a base material for immobilized enzymes, a material for ultrafiltration, a material for an aritifical kidney, an artificial blood vessel and an artificial skin, a material for edible films and dietary fibers, and a material for ion-exchange films.

The followings are the detailed explanation of the present invention.

The de-N-acetylated and etherified chitin represented by the formula (I) may be obtained by reacting the chitin with an etherifying agent and then de-N-acetylating the etherified product.

Chitin is a naturally produced mucopolysaccharide with the following formula (II):

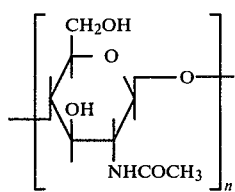
(II)

wherein n denotes the degree of polymerization.

Although n in the formula (II) can not be determined accurately because of the non-existence of a good solvent for suitably dissolving or dispersing chitin at present, as described hereinbefore, n is believed to be commonly in the range of 50 to 10,000.

By making chitin to react with a corresponding etherifying agent, for instance, chloroacetic acid, ethylene glycol, glycerol, alcohol, etc. in a method known per se, the etherified chitin of the present invention is obtainable. The etherified chitin is shown by the following formula (III).

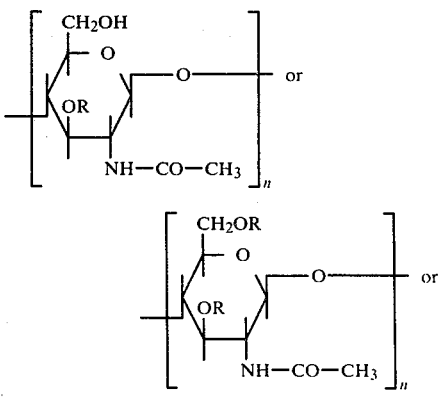
(III)

-continued

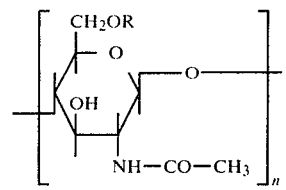

wherein R represents a carboxyalkyl group with two to four carbon atoms, a hydroxyethyl group, a hydroxypropyl group, a dihydroxypropyl group or an alkyl group with one to three carbon atoms.

The ether-linkage in the above-mentioned etherified chitin is, as are shown in the formula (III), on the 3-position carbon of its pyranose ring and/or on the 6-position carbon out of its pyranose ring, the ether-linkage on the 3-position carbon being presumably predominant. The etherified chitin of the present invention has a degree of etherification, on the average, of 0.1 to 1.0, preferably 0.3 to 1.0 per one pyranose ring.

In addition, in the present invention, etherification may be possibly carried out by using at least two kinds of the etherifying agents, and accordingly, other than the etherified chitin shown by the formula (III), the etherified chitins having at least two kinds of substituents selected from the group consisting of carboxyalkyl group with two to four carbon atoms, a hydroxyethyl group, a hydroxypropyl group, a dihydroxypropyl group and an alkyl group with one to three carbon atoms in its molecule can also be produced. By the de-N-acetylation and the subsequent acylation, hereinafter described, of the thus obtained etherified chitin, another kinds of shaped material of this invention are possibly obtained. That is, the etherified chitin which has more than two mutually different ether-linkages in its molecule is equivalent to the etherified chitin represented by the formula (III) in the present invention.

The de-N-acetylation of the above-mentioned etherified chitin is achieved by heating the etherified chitin in an aqueous concentrated solution of alkali such as sodium hydroxide, potassium hydroxide, etc. The de-N-acetylated and etherified chitin of the present invention has a degree of de-N-acetylation, on the average, of 0.1 to 1.0 per one pyranose ring. In consideration of the solubility and the viscosity of the de-N-acetylated and etherified chitin the aqueous solution, the degree of the de-N-acetylation of the de-N-acetylated carboxymethylchitin, the de-N-acetylated carboxyethylchitin, the de-N-acetylated carboxypropylchitin, the de-N-acetylated hydroxyethylchitin, the de-N-acetylated hydroxypropylchitin, or the de-N-acetylated dihydroxypropylchitin is preferably 0.2 to 0.6. From the similar consideraton, that of the de-N-acetylated methylchitin, the de-N-acetylated ethylchitin or the de-N-acetylated propylchitin is 0.5 to 1.0, preferably 0.5 to 0.9.

The de-N-acetylated and etherified chitin thus obtained is soluble in an aqueous dilute acid solution. The aqueous dilute acid solution herein mentioned means an aqueous solution of an organic acid such as acetic acid, oxalic acid, etc. or of an inorganic acid such as hydrochloric acid, which has a concentration to dissolve the de-N-acetylated and etherified chitin of the invention.

Although the de-N-acetylated and etherified chitins with a higher degree of de-N-acetylation have a tendency in which the reaction velocity with an acylating agent described later becomes smaller, they are more easily soluble in the aqueous solution as compared to the chitosan and their viscosity in the aqueous solution is also smaller than that of the chitosan. Accordingly, they can be utilized in a higher concentrated solution than the chitosan, and it makes possible to obtain a shaped material having a molecular sieve effect to molecules with a broad range of molecular diameter, larger than that of the chitosan.

The shaped material of the present invention is produced by converting the de-N-acetylated and etherified chitin of the formula (I) into the afore-defined denatured chitin. This conversion is performed by acylating the de-N-acetylated and etherified chitin in an aqueous solution with an anhydride of organic acid. In order to perform the acylation, at first, the aqueous solution of the de-N-acrylated substance of the formula (I) is prepared, which is easily obtained by dissolving the substance of formula (I) into the aqueous dilute acid solution.

In addition, it is also noted that the above-mentioned aqueous solution of the de-N-acetylated substance is alternatively obtained by dissolving a salt of the de-N-acetylated substance of formula (I) into water. The salt of the de-N-acetylated substance of formula (I) includes alkali metal salts, alkaline earth metal salts and ammonium salt of the de-N-acetylated carboxyalkylchitin, and acetate, hydrochloride, etc. of the de-N-acetylated substance of formula (I). That is, these salts are equivalent to the de-N-acetylated substance of formula (I) in the process for producing the shaped material according to the present invention. Further, the de-N-acetylated carboxyalkylchitin dissolves into an alkaline solution.

The concentration of the de-N-acetylated substance of formula (I) in the aqueous solution affects the strength and the density of the shaped material to be produced, and when it is larger, the shaped material of larger strength and denser in structure is obtained, and such a shaped material exhibits a molecular sieve effect also on the larger molecules. Usually the concentration of the de-N-acetylated substance of formula (I) in the aqueous solution may be 1 to 10% by weight, however, the concentration should be adequately adjusted accoridng to the use and the property of the shaped material of the present invention, and it is not necessarily restricted in the above-mentioned range.

When the vicosity of the aqueous solution of the de-N-acetylated substance of formula (I) is high, sometime it is difficult to obtain a spherically shaped material with a small diameter or other shaped material of the invention, and in such a case, a viscosity-reducing agent such as ethylene glycol, glycerol, alcohol, etc. may be added in the above-mentioned aqueous solution.

In the process for producing the shaped material according to the invention, the anhydride of organic acid and the organic acid are exemplified by aliphatic or aromatic organic acids with one to twenty carbon atoms and the anhydrides thereof, for exemple, acetic acid, propionic acid, butylic acid, valeric acid, benzoic and their anhydrides. The anhydride of organic acid in acylating the de-N-acetylated and etherified chitin may be one of the above-mentioned anhydrides or a mixture of more than two thereof. Although the amount of the acylating agent in the process of the present invention is not particularly restricted, it is usually 1 to 100 times by equivalent, preferably 5 to 20 times by equivalent per one equivalent of amino group of the de-N-acetylated substance of the formula (I).

The above-mentioned anhydride of organic acid may be used as it is without any dilution, or may be diluted with an organic acid or with an organic solvent which does not react with the anhydride or organic acid, for instance, benzene, toluene, xylene, dekalin, etc. for the purpose of controlling the reaction velocity or of facilitating the treatment of reaction product. In addition, in order to facilitate the control of the state of dispersed particles of the de-N-acetylated substance in the above-mentioned anhydride of organic acid, the above-mentioned organic solvent is favorably added to the reaction system in an amount of 10 to 1,000 times by weight, preferably 10 to 500 times by weight of the above-mentioned solution of the de-N-acetylated substance.

The temperature of the acylation is 5° to 80° C., preferably 5° to 60° C. When the de-N-acetylated substance of the degree of de-N-acetylation of more than 0.6 is acylated, a higher temperature is preferable.

Although the mechanism of the acylation of the present invention has not been elucidated, the reaction takes place at once when the aqueous solution of the de-N-acetylated and etherified chitin is brought into contact with the anhydride of organic acid. The reaction proceeds from the surface of the aqueous solution to be formed into the shaped material and forms an insoluble membrane consisting of the acylated denatured chitin on the surface of the aqueous solution. The interior of the thus formed membrane is still maintained at a state of the aqueous solution. As the reaction still proceeds, the anhydride of organic acid diffuses into the interior via the above-mentioned membrane to bring out the acylating reaction therein gradually, and thereby the insolubilization of the interior is accompanied.

Accordingly, the present invention possibly can provide a shaped material having its surface layer comprising the insolubilized denatured chitin and its interior comprising the unreacted de-N-acetylated substance of etherified chitin or salt thereof, depending on the degree of proceeding of the acylation. In the case where the de-N-acetylated and etherified chitin is the de-N-acetylated carboxyalkylchitin, the interior of the shaped material having only its surface layer insolubilized comprises the de-N-acetylated carboxyalkylchitin which is an amphoteric and polymeric electrolyte having amino groups and carboxyl groups. Accordingly, such a shaped material is possibly applied to further broad fields due to the interior amphoteric electrolyte. For example, such a shaped material may be employed as a base material for immobilizing both the acidproof enzymes and the alkaliproof enzymes.

The acylation according to the process of the invention predominantly takes place on N-position which is bonded to the carbon atom on 2-position of the pyranose ring, as shown, for example, by the following formula (IV) to (VI). Since the ether linkage in the de-N-acetylated and etherified chitin is apt to be broken during the acylation thereof, in such a case, another acylation may be occur on O-position which is bonded to the carbon atom of 3-position of pyranose ring or of 6-position out of the pyranose ring according to the following formula (VI):

$$C_6H_8O_3.(OR).NHCOR' \qquad (IV)$$

$$C_6H_8O_3.(OH).NHCOR' \qquad (V)$$

$$C_6H_8O_3.(OCOR').NHCOR' \qquad (VI)$$

wherein R has the same meaning as in formula (I), R' is an alkyl group or an aryl group.

In the denatured chitin of the shaped material of the present invention, the proportion of the product of formula (IV) is usually less than 10% and the rest is mainly occupied by the products of formula (V) and (VI), and accordingly the denatured chitin of the present invention is insoluble in acids and aqueous alkaline solution.

In the next place, the mode of the contact between the aqueous solution of the de-N-acetylated and etherified chitin and the anhydride of organic acid can be adequately selected depending on the use and shape of the shaped material of the present invention, thereby obtaining any one of optionally shaped material.

For instance, one of the modes of the contact is shown when the aqueous solution of the de-N-acetylated and etherified chitin is dropwise added and dispersed into the anhydride of organic acid under agitation. In this mode, the reaction takes place at once from the surface of the drop of the aqueous solution to form an insolubilized membrane of the denatured chitin of the present invention, resulting into a spherically formed capsule-like product. In the case where the reaction is made to progress further on, the acid anhydride diffuses into the interior of the drop to form an optionary thicker film. After letting the reaction proceed for a predetermined period of time, the thus formed product is separated and washed with water to remove the unreacted acid anhydride. The shaped material thus prepared has been infusibilized only on its surface layer. The size of the spherical product can be adjusted within a broad range of its diameter of about 1 to 10,000$\mu$ by varying the size of the above-mentioned drop. The thickness and compactness of the insolubilized surface layer are variable by controlling the concentration of the aqueous solution of the de-N-acetylated and etherified chitin, the time period and the temperature of the reaction within a range of the thickness of 0.1 to 1,000$\mu$ and a range of the compactness with a permeable threashold of from 500 to 400,000 in molecular weight. By the way, it is natural that the further progress of the reaction produces the spherically shaped material composed substantially of the insolubilized denatured chitin.

In the above-mentioned mode of the contact, in order to form droplets of the aqueous solution of the de-N-acetylated substance and to disperse the thus formed droplets into the acid anhydride, a vessel provided with a stirrer of blade type, such as a static mixer, a homogenizer, etc. may be utilized. Further, a suspending agent may be contained in the above-mentioned anhydride of organic acid. The suspending agent used in the present invention is preferably selected from those of non-ionic type, for instance, polyoxyethylene sorbitol, polyoxyethylene stearate, polyoxyethylene alkyl ether, sorbitane monolaurate, etc. The amount of the suspending agent may be usually selected optionally in the range of 0.001 to 10% by weight of the amount of the aqueous solution of the de-N-acetylated and etherified chitin. In addition, by spraying the aqueous solution of the de-N-acetylated product into a mist of the acid anhydride, the ultramicrospherically shaped material of the present invention can be obtained, the surface layer of the ultramicrospherical droplets being infusibilized instantly by acylation.

An another mode of the contact is the spinning of the aqueous solution of the de-N-acetylated and etherified chitin through nozzles into a liquid containing the organic acid anhydride to obtain a fiber at the least of which surface is infusibilized. By washing the fiber a fiber-shaped material of the present invention is possibly obtained. A hollow fiber is also obtained by spinning a hollow fiber in the known manner.

In addition, by utilizing slits in place of the above-mentioned nozzles, film-like shaped material of the present invention is obtained. In either case of producing the fiber- or film-shaped material, the thickness and compactness of the infusibilized shaped material are possibly adjusted depending on the necessity as in the case of producing the spherically shaped material hereinbefore described.

In addition to the above-mentioned modes of the contact, the present invention is able to take several other modes of the contact and so the shaped material of the present invention is able to take any three-dimensional structure.

The shaped material of the present invention thus obtained may be subjected to the cross-linking treatment, if necessary. One of the cross-linking treatments is as follows.

In the cross-linking treatment, at first, the moisture content of the shaped material is made to be 2 to 3 times by weight of the shaped material at a dried state. Then the shaped material is soaked in an aqueous sodium hydroxide solution of a concentration more than 40% by weight and an amount of more than 2 times, preferably 4 to 30 times by weight of the dried shaped material at a temperature of lower than 15° C. for one to 5 hours. After that, an excess sodium hydroxide solution is removed and the material is left to stand at a soaked state in the aqueous sodium hydroxy solution of an amount of 3 to 6 times by weight of the dried shaped material at a temperature of 0° to 10° C. for one to 24 hours to obtain a pre-treated material by alkali. After optionally freeze-drying the pre-treated material at a temperature of 0° to −30° C. for one to 24 hours, the pre-treated material is then dispersed in an aqueous solution or an organic solvent containing a cross-linking agent in an amount of 0.1 to 3 times by mole, preferably 0.5 to 2 times by mole per one pyranose ring and is made to react at a temperature of lower than 15° C. for 5 to 48 hours. After the reaction is over, the reaction product is washed and neutralized to obtain a cross-linked shaped material. As the cross-linking agent, epoxy-type cross-linking agents such as epichlorohydrin, epibromohydrin, 2,3-dibromoproapanol and 2,3-dichloropropanol are suitable. The degree of cross-linking may be sufficient at 0.01 to 0.3 per one unit of pyranose ring.

In addition, when the interior of the shaped material is not acylated or insolubilized, the cross-linking agent may be selected from aldehydes such as formaldehyde, glyoxal and glutaraldehyde which form a Schiff base with the de-N-acetylated and etherified chitin in the interior of the shaped material.

As is clearly seen from the foregoings, according to the present invention, the shaped material with a structure of granule, sphere, fiber, film, rod, tube or the like as well as the hollow structure thereof, if necessary, is easily produced. In addition, a shaped material with cellular structure is also obtained by freeze-drying the gel-like shaped material of the present invention.

Besides, since the above-mentioned shaped material is composed of the chemically and biologically stable and safe denatured chitin and has a substance-permeable property, it is applicable to a broad range of use. Examples of the use are, for instance, the separation and purification of polysuccharides, proteins, and the mixtures thereof, etc. by immersing the shaped material into an aqueous solution of polysuccharides, proteins or the mixture thereof of various molecular weight and dispersing only the substance of molecular weight less than a predetermined value into the shaped material. The filamentously shaped or film-likely shaped material are similarly usable same as a conventional material for dialysis. Moreover, utilizing the controllability of its permeability to substances and the presence of ionic groups in its structure, the shaped material is also utilizable as an ion-exchange body. Because of the stability and the safety of the shaped material to living bodies, the use of the shaped material in the fields of concerns of living bodies, for instance, for blood perfusion, for an adsorbent of gastrointestinal toxins after internally administered or for the coating agent of the adsorbent, is possible.

In addition, in the case where the shaped material is used for the contact with blood, it is more preferable to adjust the acylation to leave some amino groups standing in free state and then to make a polyion with an anti-thromobolytic agent such as heparin, chitosan sulfate, chitin sulfate, etc.

Also, it is possible to confine several useful functional substances within the shaped material of the present invention. For instance, by confining several ion-exchange resins within the shaped material, a novel ion-exchange body coated by a chitinic membrane having a limited ion-exchanging activity only to substance with molecular weight less than a predetermined value is obtained, and by coating an adsorbent such as activated carbon with the shaped material of the present invention, an adsorbent having a novel functional ability never known before is obtained.

As has been explained, the present invention is really epoch-making by which chitin becomes utilizable in infinitely developing fields of application.

The present invention will be explained in more detail referring to the following non-limiting Examples.

EXAMPLE 1

After dissolving 50 g of a sodium salt of de-N-acetylated carboxymethylchitin with a degree of carboxymethylation of 1.0 and a degree of de-acetylation of 0.5 into 950 ml of water to be a concentration of 5%, the solution was added dropwise to a mixture of 5 liters of acetic anhydride and 1 liter of acetic acid under agitation at a temperature of 25° C. The precipitated insoluble substance appeared after 10 minutes from the end of addition. Then the precipitate was filtered, washed and dried to obtain a spherical product of 20 to 100μ in diameter. The yield was 48 g.

After pulverizing 10 g of the product, it was thrown into 100 ml of an aqueous 5% sodium hydroxide solution under agitation and then the mixture was neutralized. The neutralizate was filtered to obtain an insoluble substance, which was washed with water and then with ethanol and then dried. The filtrate was condensed by an evaporator and then freeze-dried, however, no residue was obtained.

The results of the elementary analysis of the dried product thus obtained are shown in Table 1. The elementary analytical data of chitin and the carboxymethylchitin used in Example 1 are also shown in Table 1.

TABLE 1

| | Elementary Analytical Data (%) | | | |
|---|---|---|---|---|
| | C | H | O | N |
| Product of Example 1 | 46.0 | 6.6 | 40.8 | 6.6 |
| Chitin | 47.3 | 6.4 | 39.4 | 6.9 |
| Carboxymethylchitin | 44.9 | 5.8 | 43.4 | 5.9 |

Table 1 shows that the elementary analytical data of the product of Example 1, which is a spherically shaped material comprising a denatured chitin according to this invention, is quite similar to that of the chitin.

EXAMPLE 2

A fiberous shaped material was prepared in this example. 20 g of a de-N-acetylated carboxymethylchitin with a degree of carboxymethylation of 0.5 and a degree of de-N-acetylation of 0.25 was dissolved into 180 ml of an aqueous sodium hydroxide solution and then the solution was de-aerated under reduced pressure to obtain an aqueous solution of the de-N-acetylated carboxymethylchitin. The fiberous shaped material was obtained by spinning the aqueous solution thus obtained by using a spinning apparatus, which was provided with a tank for the aqueous solution of the de-N-acetylated substance, a reacting vessel of 50 mm in diameter and 3,000 mm in length provided with 25 nozzle-holes of 0.05 mm in diameter, a solvent-removing vessel containing an aqueous 50% ethanol solution, an another solvent-removing vessel containing hot water at a temperature of 100° C. and a take-up winder. In the reacting vessel, propionic anhydride was placed at a temperature of 20° C. The pressure of output of the aqueous solution of the de-N-acetylated substance from the nozzle-hole into the reacting vessel was 2 Kg/cm$^2$ for spinning.

Since no soluble component in the thus obtained fiberous product was obtained by treating the product as in Example 1, the product of this example was considered to be consisted of the insoluble denatured chitin of this invention. Table 2 shows the elementary analytical data of the product of Example 2.

TABLE 2

| | Elementary Analytical Data (%) | | | |
|---|---|---|---|---|
| | C | H | O | N |
| Product of Example 2 | 50.0 | 6.4 | 36.8 | 6.8 |
| de-N-acetylated carboxymethylchitin | 47.1 | 5.8 | 41.0 | 6.1 |

EXAMPLE 3

Seventeen grams of the dried product obtained in Example 1 were swollen in distilled water and packed into a glass column of 2 cm in diameter. Using this column, a gel-filtration test was performed. Into the column, a mixed specimen comprising 20 mg of blue dextran (molecular weight of 2,000,000) and 30 mg of glucose dissolved in 2 ml of distilled water was added and an elution was carried out with distilled water at a velocity of 1 ml/min. Blue dextran was eluted in 30 to 45 ml of the eluate and the glucose was eluted in 65 to 80 ml of the eluate.

The above-mentioned results show that the spherical product obtained in Example 1 has a separating ability, and that the blue dextran having a molecular weight of 2,000,000 had not diffused within the spherical product.

EXAMPLES 4 TO 6

The other spherical products were produced by using the other de-N-acetylated carboxymethylchitin under different conditions (the concentration of the de-N-acetylated carboxymethylchitin in the aqueous solution and the kind of acylating agent and reaction conditions) from Example 1, however, by the same producers as in Example 1. The conditions and the results are shown in Table 3. As is shown in Table 3, the acylation according to the process of the present invention is carried out within a very short period of time.

TABLE 3
Conditions and Results of Acylation

| Example | de-N-acetylated carboxymethylchitin *A | **B | ***C | Acylating agent | Reaction Temp. (°C.) | Hr. (min) | Elementary analytical data (%) C | H | O | N |
|---|---|---|---|---|---|---|---|---|---|---|
| 4 | 0.5 | 0.5 | 8 | propionic anhydride | 25 | 5 | 50.5 | 6.7 | 36.4 | 6.4 |
| 5 | 1.0 | 0.5 | 5 | acetic anhydride/ acetic acid (1:1) | 20 | 5 | 52.0 | 7.6 | 34.5 | 5.9 |
| 6 | 1.0 | 1.0 | 10 | acetic anhydride/ acetic acid (2:1) | 50 | 10 | 46.5 | 6.9 | 39.7 | 6.9 |

Note:
*A: degree of carboxymethylation
**B: degree of de-N-acetylation
***C: concentration (% by weight)

EXAMPLE 7

In this example, a spherically shaped material of which surface layer comprising the insoluble denatured chitin is prepared, which is hereinafter referred to as a microcapsule.

Ten grams of a sodium salt of de-N-acetylated carboxymethylchitin with a degree of carboxymethylation of 1.0 and a degree of de-N-acetylation of 0.5 were dissolved in 190 ml of water to be an aqueous solution with a concentration of 5% and the solution was added dropwise into a mixture of 1,000 ml of acetic anhydride and 50 ml of acetic acid under agitation at a temperature of 15° C. After 2 minutes, an insoluble surface membraneous film on the dispersed drops was formed. The solidified particles thus obtained was filtered and washed with water to obtain microcapsules of 20 to 100μ in diameter.

Fifty grams of these microcapsules were assembled and pulverized by a mixer and placed in an alkaline solution. The insoluble component in the microcapsules was collected and washed several times with ethanol and dried. The soluble component in the microcapsules was condensated in an evaporator and freeze-dried. Their weights and the elementary analytical data are shown in Table 4.

TABLE 4

| | Weight (g) | Elementary analytical date (%) C | H | O | N |
|---|---|---|---|---|---|
| insoluble component | 0.5 | 46.0 | 6.6 | 40.8 | 6.6 |
| soluble component | 2.0 | 45.0 | 6.0 | 42.9 | 6.1 |

As are seen in Table 4, the insoluble component of the microcapsules was very similar to chitin, and the soluble component of the microcapsules comprised the 50% de-acetylated carboxymethylchitin.

EXAMPLE 8

The procedures of Example 2 was repeatedly carried out under the same conditions except for using a reacting vessel of 50 mm in diameter and 1,000 mm in length provided with 50 nozzle-holes of 0.1 mm in diameter instead of the reacting vessel of Example 2.

Since the length of the reacting vessel was shorter than that in Example 2, the degree of acylation of the product of spinning was lower than that obtained in Example 2. The surface layer of the fiber-shaped material thus obtained in the present Example consisted of the insoluble denatured chitin, and its interior consisted of the soluble de-N-acetylated carboxymethylchitin which was soluble in alkaline solution. That is, 50 g of the thus obtained fiber-shaped material was analyzed by the same method as in Example 7 to find the weights of soluble component and the insoluble component of the fiber-shaped material and their elementary analytical data. The results are shown in Table 5.

TABLE 5

| | Weight (g) | Elementary Analytical Data (%) C | H | O | N |
|---|---|---|---|---|---|
| insoluble component | 5 | 50.0 | 6.4 | 36.8 | 6.8 |
| soluble component | 45 | 46.6 | 6.3 | 41.0 | 6.1 |

EXAMPLE 9

The shaped material obtained in Example 7, that is microcapsule, was examined on its adsorbing property and the dialytic property of its surface layer, as follows:

At first, five 10 ml of test solutions each containing a solute different in molecular weight at a predetermined concentration in an aqueous physiological saline solution were prepared in five flasks. The solute used in this examination are shown in Table 7 at the left column with their concentration in the above-mentioned saline solution.

Into each solution in each flask, 5 g of the above-mentioned microcapsules were introduced, and after stirring the mixture at the room temperature for two hours, the concentration of the solute dissolved in the solution was determined. The concentrations before the addition of the microcapsules and after adding and stirring were shown in Table 6.

TABLE 6

Concentration Change

| Solute | Initial concentration (ppm) | Concentration after 2 hours of stirring (ppm) | Calcd. Value* (ppm) |
|---|---|---|---|
| Glucose | 1,000 | 680 | 667 |
| Dextran of molecular weight of 10,000 | 500 | 340 | 333 |
| Dextran of molecular weight of 70,000 | 500 | 350 | 333 |
| Dextran of molecular weight of 500,000 | 500 | 480 | 333 |
| Dextran of molecular weight of 2,000,000 | 500 | 490 | 333 |
| Albumin of molecular weight of 50,000 | 500 | 200 | 333 |

*The calculated value is the concentration of the solute calculated based on the assumption that the concentration of the solute in the microcapsule is the same as that in the test solution.

During the examination no change was observed on the appearance of the microcapsule, and the weight of the microcapsule after the examination was nearly equal to the initial weight thereof before the examination.

It is indicated in Table 6 that the dextran of molecular weight less than 70,000, the glucose and the albumin easily pass through the surface layer of the microcapsule. The concentration of the albumin in the test solution after the examination is found to be lower than the calculated value thereof, which shows that the albumin is considered to be adsorbed in the microcapsules. The test solution of albumin after the examination is not a opaque but a clear solution.

Further, it is estimated from Table 6 that the substances of molecular weight lower than 70,000 easily pass through the surface layer of the microcapsule obtained in Example 7 but the substances of molecular weight higher than 500,000 hardly pass through the surface layer.

EXAMPLE 10

Microcapsules were produced as in Example 7, however, using different de-N-acetylated carboxymethylchitins, different acylating agents under the different reaction conditions from those in Example 7. The conditions of production and the results obtained are shown in Table 7.

EXAMPLE 11

This example shows that the shaped material of the present invention is excellent in permeability.

Spherical particles of activated carbon sifted to a diameter of 0.25 to 0.60 mm were immersed in an aqueous 5% solution of a de-N-acetylated carboxymethylchitin with a degree of carboxymethylation of 0.8 and a degree of de-N-acetylation of 0.4. After filtering the mixture and removing the excess aqueous solution with a metal net of 80 mesh, the particles were left to stand at the room temperature, and dried until the coagulation of the particles almost disappeared. These semi-dried particles were thrown into a mixture of butyric anhydride and butyric acid in a ratio of 90/10 maintained at a temperature of 40° C. under agitation and were left for 2 minutes for reaction. After filtering the thus treated particles, these were washed with an aqueous 50% ethanolic solution to remove the butyric mixture. The particles were further washed with distilled water repeatedly and dried to obtain the coated spherical particles of activated carbon by the shaped material of the denatured chitin of the present invention. In order to make a comparison, spherical particles of activated carbon coated with gelatine were produced using gelatin by a publicly known method.

0.5 g of each particles of activated carbon coated by the shaped material of the present invention, those coated by gelatin and those not coated were respectively thrown into each of the two aqueous solution one of which contains creatinine of 200 ppm in 100 ml and the other of which contains vitamin $B_{12}$ of 200 ppm in 100 ml, and the mixtures were agitated. The results of determination of the concentration of the creatinine and the vitamin $B_{12}$ in these solution as the time passed by are shown in Tables 8 and 9. Their concentrations shows a gradual reduction with time because of their adsorption to the activated carbon.

TABLE 8

Reduction of Concentration of Creatinine

| Activated carbon | Time (hour) | Concentration of Creatinine (ppm) | | | | |
|---|---|---|---|---|---|---|
| | | 0 | 1 | 2 | 4 | 6 |
| Not coated | | 200 | 45 | 25 | 18 | 14 |
| Coated with shaped material of present invention | | 200 | 55 | 31 | 20 | 15 |
| Coated with gelatine | | 200 | 80 | 43 | 35 | 30 |

TABLE 7

| de-N-acetylated carboxymethylchitin | | | Acylating agent | Reaction | | Results Elementary analytical data (%) | | | | ****D |
|---|---|---|---|---|---|---|---|---|---|---|
| *A | **B | ***C | | Temp. (°C.) | Period (min) | C | H | O | N | |
| 0.5 | 0.5 | 8 | propionic anhydride | 20 | 2 | 50.2 | 6.7 | 36.7 | 6.4 | 80/20 |
| 1.0 | 0.5 | 5 | butyric anhydride | 15 | 2 | 52.1 | 7.5 | 34.4 | 6.0 | 75/25 |
| 1.0 | 1.0 | 10 | acetic anhydride | 50 | 5 | 46.5 | 6.8 | 39.9 | 6.8 | 85/15 |

Notes:
*A: Degree of carboxymethylation
**B: Degree of de-acetylation
***C: Concentration in aqueous solution (% by weight)
****D: Ratio of soluble component/insoluble component

TABLE 9

Reduction of Concentration of Vitamin $B_{12}$

| Activated carbon | Time (hour) | Concentration of Vitamin $B_{12}$ (ppm) | | | | |
|---|---|---|---|---|---|---|
| | | 0 | 1 | 2 | 4 | 6 |
| Not coated | | 200 | 145 | 80 | 55 | 35 |
| Coated with shaped material of present invention | | 200 | 160 | 92 | 61 | 38 |
| Coated with gelatin | | 200 | 195 | 182 | 160 | 133 |

As are seen in Tables 8 and 9, the creatinine of a smaller molecular weight was adsorbed onto the coated activated-carton by the shaped material of the present invention at nearly the same velocity as the velocity at which it was adsorbed onto the not-coated activated-carbon, and the fact was the same as in the case of the vitamin $B_{12}$ of a far larger molecular weight. This is considered that the creatinine and the vitamin $B_{12}$ is allowed to nearly freely pass through the coating layer of the shaped material on the activated carbon. Therefore, it is suggested that the permeability of the shaped material of the present invention is fairly large.

On the other hand, in the case of the gelatin-coated activated-carbon, the velocity was a little reduced to creatinine and was highly reduced to vitamin $B_{12}$, which suggests the smaller permeability of gelatin layer.

EXAMPLE 12

5 g of a de-N-acetylated and etherified chitin with ethylene glycol, of which the degree of hydroxyethylation of 1.0 and the degree of de-acetylation of 1.0, were dissolved into 100 ml of an aqueous 2% acetic acid solution, and 50 g of ethylene glycol were added to the solution to prepare an aqueous solution of the de-N-acetylated substance. The thus obtained aqueous solution is hereinafter referred as A-liquid.

Separately, 3 g of a suspending agent of polyoxyethylene sorbitane laurate and 10 g of acetic anhydride were dissolved in 2 liters of toluene placed in a vessel provided with a bow-type stirrer to prepare an acetylating solution containing the suspending agent.

To the solution containing the suspending agent under agitation of 600 r.p.m. at the room temperature, the above-prepared A-liquid was added to bring the de-N-acetylated substance into acetylation in a dispersed state for one hour. After the reaction was over, one liter of ethanol was added to the reaction mixture under agitation to obtain the deposited transparent spherules of the shaped material. After separating the spherules by filtration and washing the collected spherules with ethanol, the spherules were dispersed in one liter of distilled water and the pH of the dispersion was made to 8.0 by an sodium hydroxide solution.

Then the spherules were separated by filtration and the collected spherules were washed with water to remove the adhered sodium acetate and sodium hydroxide to obtain the spherical gel-like shaped material of 50 to 250μ in diameter of the present invention. The thus obtained gel-like spherically shaped material contained as much as 15 times by weight of water, and it was insoluble in an aqueous 5% acetic acid solution. The freeze-dried product of the gel-like spherically shaped material showed no absorption band at 1500 to 1530 $cm^{-1}$ of amino group in infrared absorption spectrum and an elementary analytical values of C of 46.5%, H of 6.5%, O of 40.3% and N of 6.7%, very similar to the values of chitin.

EXAMPLE 13

To an solution prepared by dissolving 5 g of de-N-acetylated methylchitin with a degree of methylation of 0.5 and a degree of de-N-acetylation of 0.9 into 100 ml of an aqueous 5% acetic acid solution, 50 g of ethylene glycol dimethyl ether were added to form an uniform solution. This uniform solution is hereinafter referred to as B-liquid.

Separately, 3 g of a suspending agent of sorbitan monolaurate and 20 g of propionic anhydride were admixed into 2 liters of xylene placed in a vessel provided with a bow-type stirrer to prepare a solution containing the suspending agent. To the solution containing the suspending agent at a temperature of 50° C., the above-mentioned B-liquid was added slowly under agitation at 600 r.p.m. for propionylation of the de-N-acetylated methylchitin for one hour. After the reaction was over, one liter of ethanol was added to the reaction mixture under agitation to obtain a deposition of transparent spherically shaped materials. After the same treatments as in Example 12, 50 g of gel-like spherically shaped materials of 100 to 300μ in diameter of the present invention were obtained in a water-containing state. The thus obtained material did not dissolve in an aqueous 1 N hydrochloric acid solution, an aqueous 2 N sodium hydroxide solution and an aqueous 10% sodium carbonate solution, respectively. The freeze-dried product of the gel-like material showed an elementary analytical data of C of 50.5%, H of 6.7%, O of 36.4% and N of 6.4%.

EXAMPLE 14

Procedures of Example 12 were repeatedly carried out, except for using a uniform mixture of 100 g of the A-liquid in Example 12 and one liter of the solution containing the suspending agent in Example 12 in a static mixer (element number of 10) instead of the A-liquid in Example 12 to obtain a gel-like transparent spherically shaped material of this invention. Particle diameter of the gel-like spherules was 10 to 50μ and they did not dissolve into an aqueous 1 N hydrochloric solutions, an aqueous 2 N sodium hydroxide solution and an aqueous 10% sodium carbonate solution, respectively.

EXAMPLE 15

Procedures of Example 12 were repeatedly carried out using the de-N-acetylated and etherified chitins and the acylating agents shown in Table 10 instead of the de-N-acetylated and etherified chitin with ethylene glycol and acetic anhydride in Example 12 to obtain gel-like spherically shaped materials of the present invention. The freeze-dried products of the gel-like spherically shaped material showed the elementary analytical data indicated in Table 10, and they did not show the infrared absorption band at 1500 to 1530 $cm^{-1}$ of amino group. The products did not dissolve in acids nor in alkaline solutions.

TABLE 10

| | De-N-acetylated and etherified chitin | | | Elementary Analytical Data (%) | | | |
|---|---|---|---|---|---|---|---|
| | Degree of etherification | Degree of de-N-acetylation | Acylating agent | C | H | O | N |
| De-N-acetylated and etherified chitin with glycerol | 0.3 | 0.5 | Butyric anhydride | 52.0 | 7.5 | 34.4 | 6.1 |
| De-N-acetylated ethylchitin | 0.5 | 0.8 | Propionic anhydride | 50.0 | 7.1 | 36.5 | 6.4 |

EXAMPLE 16

The gel-like spherically shaped material of the present invention obtained in Example 12 was water-sifted to be the size of 50 to 150μ, and the thus selected particles were packed in a column of 2 cm in diameter at a volume of 150 ml and the column was used for the following experiments of substance-separation:

2 ml of aqueous solutions containing 20 mg of glucose, 20 mg of blue dextran of molecular weight of 2,000,000 and 20 mg of dextran of molecular weight of 10,000 in distilled water was developed on the above-mentioned column, and distilled water was poured into the column at a volume velocity of 1 ml/min. By the identification of eluted substances in the aqueous effluent, the position of each eluted substance in the fraction of the aqueous effluent was determined. The results are shown in Table 11.

TABLE 11

| Eluted substance | Position of the eluted substance in the effluent (ml) |
|---|---|
| Blue dextran | 55–65 |
| Dextran | 90–100 |
| Glucose | 150–160 |

As is seen in Table 11, the gel-like spherically shaped material of the present invention has a substance-separating ability, and so effective as a packing material for chromatography. In addition, it was found that the gel-like spherically material after the above-mentioned experiment had no blue dextran diffused thereinto.

EXAMPLE 17

In a basket-type centrifuging tube provided with a nylon-net, 100 g of the gel-like spherically shaped material obtained in Example 12 were introduced and centrifuged until the water-content thereof became 2 g per g of the dried weight of the shaped material. Then, the dehydrated shaped material was soaked into an aqueous 43.5% sodium hydroxide solution of an amount of 23 times by weight of the dehydrated material, at a temperature of 10° C. for 3 hours under agitation. Then, the excess alkali was removed until the amount of alkali became 3 times by weight of the dried weight of the shaped material. After leaving the thus treated shaped material to stand for 2 hours at a temperature of 0° C., it was frozen for one hour at a temperature of −20° C. to obtain the alkali-treated shaped material in a frozen state.

Separately, an amount of epichlorohydrin of 2 times by mole per one pyranose ring of the dried shaped material was dissolved in 50 times by weight of isopropyl alcohol and the solution was placed in a flask provided with a stirrer at a temperature of 0° to 5° C.

The frozen material which was pre-treated with alkali was added to the solution in the flask under agitation to make them react for 5 hours and then the reaction was continued further for 5 hours at a temperature of 15° C. After the reaction was over, the thus cross-linked product was separated by filtration and washed with ethanol, and then dispersed into water. The dispersion was neutralized with an aqueous 1 N hydrochloric acid while cooling from outside. The deposited product was filtered and washed with water to obtain the cross-linked spherically shaped material. According to the infrared absorption spectrum of the cross-linked shaped material, the thus prepared shaped material was found not to have been de-acetylated. Its degree of cross-linking was determined to be 0.12 per one pyranose ring by the elementary analytical data.

What is claimed is:

1. A shaped material having a surface layer which consists essentially of a denatured chitin obtained by acylation of de-N-acetylated and etherified chitin represented by the following general formula (1):

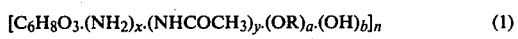

$$[C_6H_8O_3.(NH_2)_x.(NHCOCH_3)_y.(OR)_a.(OH)_b]_n \quad (1)$$

wherein R represents a carboxyalkyl group with two to four carbon atoms, a hydroxyethyl group, a hydroxypropyl group, a dihydroxypropyl group or an alkyl group with one to three carbon atoms, x is a number of 0.1 to 1.0, y=1.0−x, a is a number of 0.1 to 1.0, b=1.0−a, and n is the degree of polymerization or a salt thereof and having an interior which consists essentially of the de-N-acetylated and etherified chitin of the formula (1) or a salt thereof.

2. The shaped material according to claim 1, wherein the de-N-acetylated and etherified chitin is a de-N-acetylated carboxymethylchitin, a de-N-acetylated carboxyethylchitin, a de-N-acetylated carboxypropylchitin or a salt thereof.

3. The shaped material according to claim 2, wherein the salt is an alkali metal salt, an alkaline earth metal salt or an ammonium salt.

4. The shaped material according to claim 1, wherein the de-N-acetylated and etherified chitin is a de-N-acetylated hydroxyethylchitin, a de-N-acetylated hydroxypropylchitin or a salt thereof.

5. The shaped material according to claim 1, wherein the de-N-acetylated and etherified chitin is a de-N-acetylated dihydroxypropylchitin or a salt thereof.

6. The shaped material according to claim 1, wherein the de-N-acetylated and etherified chitin is a de-N- acetylated methylchitin, a de-N-acetylated ethylchitin, a de-N-acetylated propylchitin or a salt thereof.

7. The shaped material according to claim 2, 3, 4 or 5, wherein the degree of de-N-acetylation of the de-N-acetylated and etherified chitin is 0.2 to 0.6.

8. The shaped material according to claim 6, wherein the degree of de-N-acetylation of the de-N-acetylated and etherified chitin is 0.5 to 1.0, preferably 0.5 to 0.9.

9. A shaped material consists essentially of a denatured chitin obtained by acrylation of a de-N-acetylated and etherified chitin represented by the following general formula:

$$[C_6H_8O_3 \cdot (NH_2)_x \cdot (NHCOCH_3)_y \cdot (OR)_a \cdot (OH)_b]_n$$

wherein R represents a carboxyalkyl group with two to four carbon atoms, a hydroxyethyl group, a hydroxypropyl group, a dihydroxypropyl group or an alkyl group with one to three carbon atoms, x is a number of 0.1 to 1.0, y = 1.0 − x, a is a number of 0.1 to 1.0 b = 1.0 − a, and n is the degree of polymerization or a salt thereof.

10. The shaped material according to claim 9, wherein the de-N-acetylated and etherified chitin is a de-N-acetylated carboxymethylchitin, a de-N-acetylated carboxyethylchitin, a de-N-acetylated carboxypropylchitin or a salt thereof.

11. The shaped material according to claim 10, wherein the salt is an alkali metal salt, an alkaline earth metal salt or an ammonium salt.

12. The shaped material according to claim 9, wherein the de-N-acetylated and etherified chitin is a de-N-acetylated hydroxyethylchitin, a de-N-acetylated hydroxypropylchitin or a salt thereof.

13. The shaped material according to claim 9, wherein the de-N-acetylated and etherified chitin is a de-N-acetylated dihydroxypropylchitin or a salt thereof.

14. The shaped material according to claim 9, wherein the de-N-acetylated and etherified chitin is a de-N-acetylated methylchitin, a de-N-acetylated ethylchitin, a de-N-acetylated propylchitin or a salt thereof.

15. The shaped material according to claim 9, wherein the degree of de-N-acetylation of the de-N-acetylated and etherified chitin is 0.2 to 0.6.

16. The shaped material according to claim 14, wherein the degree of de-N-acetylation of the de-N-deacetylate and etherified chitin is 0.5 to 1.0, preferably 0.5 to 0.9.

17. A shaped material at least the surface of which layer comprises a denatured chitin obtained by acylation of a de-N-acetylated and etherified chitin having at least two kinds of substituents selected from the group consisting of a carboxyalkyl group with two to four carbon atoms, a hydroxyethyl group, a hydroxypropyl group, a dihydroxypropyl group or an alkyl group with one to three carbon atoms in the molecule thereof.

18. The process for producing a shaped material of denatured chitin according to claim 1 or 9, comprising bringing an aqueous solution of a de-N-acetylated and etherified chitin of the general formula:

$$[C_6H_8O_3 \cdot (NH_2)_x \cdot (NHCOCH_3)_y \cdot (OR)_a \cdot (OH)_b]_n$$

wherein R represents a carboxyalkyl group with two to four carbon atoms, a hydroxyethyl group, a hydroxypropyl group, a dihydroxypropyl group, or an alkyl group with one to three carbon atoms, x is a number of 0.1 to 1.0, y = 1.0 − x, a is a number of 0.1 to 1.0, b = 1.0 − a, and n is the degree of polymerization or a salt thereof into contact with an anhydride of an aliphatic or aromatic organic acid having one to twenty carbon atoms to obtain the shaped material at least the surface layer of which is acylated.

19. The process according to claim 18, wherein the contact is carried out in the presence of an organic acid.

20. The process according to claim 18, wherein the concentration of the de-N-acetylated and etherified chitin in the aqueous solution is 1 to 10% by weight.

21. The process according to claim 18, wherein the amount of the anhydride of organic acid is 1 to 100 equivalents, preferably 5 to 20 equivalents to one equivalent of amino group of the de-N-acetylated and etherified chitin.

22. The process according to claim 18, wherein the contact is carried out in the presence of an organic solvent inert to the reactants, the amount of the organic solvent being 10 to 1000 times by weight, preferably 10 to 500 times by weight of the amount of the aqueous solution of the de-N-acetylated and etherified chitin.

23. The process according to claim 18, wherein the aqueous solution of the de-N-acetylated and etherified chitin is brought into contact with a mixture of the anhydride of organic acid and a suspending agent.

24. The process according to claim 23, wherein the amount of the suspending agent is 0.001 to 10% by weight of the amount of the aqueous solution of the de-N-acetylated and etherified chitin.

25. The process according to claim 18, wherein after the acylation by contact has been completed, the obtained reaction product is further cross-linked with at least one cross-linking agent selected from the group consisting of epichlorohydrin, epibromohydrin, 2, 3-dichloropropanol, 2,3-dibromopropanol, formaldehyde, glyoxal and glutaraldehyde, the cross-linking degree being 0.01 to 0.3 per one pyranose ring.

26. The process according to claim 18, wherein aqueous solution of the de-N-acylated and etherified chitin is added dropwise into the anhydride or organic acid to obtain a spherically shaped material.

27. The process according to claim 18, wherein the aqueous solution of the de-N-acetylated and etherified chitin is spun via nozzles into the anhydride of organic acid to obtain a fibrous shaped material or a hollow fibrous shaped material.

28. The process according to claim 18, wherein the aqueous solution of the de-N-acetylated and etherified chitin is put into the anhydride of organic acid via a slit to obtain a film-shaped material.

29. The process according to claim 24, wherein the suspending agent is selected from the group consisting of polyoxyethylene sorbitol, polyoxyethylene stearate, polyoxyethylene alkyl ether and sorbitan monolaurate.

30. The shaped material according to claim 1, wherein the degree of etherification of the de-N-acetylated and etherified chitin is 0.3 to 1.0 per one pyranose ring.

31. The shaped material according to claim 1, wherein the shaped material has the structure of a granule, sphere, film, fiber or rod.

32. The shaped material according to claim 1, wherein the shaped material has the structure of a hollow fiber.

33. The shaped material according to claim 1, wherein the shaped material is of a cellular structure.

34. The shaped material according to claim 9, wherein the degree of etherification of the de-N-acetylated and etherified chitin is 0.3 to 1.0 per one pyranose ring.

35. The shaped material according to claim 9, wherein the shaped material is of a granule, sphere, film, fiber or rod structure.

36. The shaped material according to claim 9, wherein the shaped material is of a hollow fiber structure.

37. The shaped material according to claim 9, wherein the shaped material is of a cellular structure.

38. The process according to claim 18, wherein the de-N-acetylated and etherified chitin is selected from the group consisting of a de-N-acetylated carboxymethylchitin, a de-N-acetylated carboxyethylchitin, a de-N-acetylated carboxypropylchitin, a de-N-acetylated hydroxyethylchitin, a de-N-acetylated hydroxypropylchitin, a de-N-acetylated dihydroxypropylchitin, a de-N-acetylated methylchitin, a de-N-acetylated ethylchitin, a de-N-acetylated propylchitin or a salt thereof.

39. The process according to claim 38, wherein the salt is an alkali metal salt, an alkaline earth metal salt or an ammonium salt of the de-N-acetylated carboxyalkylchitin with one to three carbon atoms in a alkyl group thereof.

40. The process according to claim 18, wherein the aqueous solution is an aqueous diluted acid solution.

* * * * *